(12) United States Patent
Plitzuweit (10) Patent No.: US 7,475,188 B1
(45) Date of Patent: Jan. 6, 2009

(54) AUTOMATIC DRIVE SELECTION IN OPTICAL MEDIA RECORDING

(75) Inventor: Paul Plitzuweit, Eagan, MN (US)

(73) Assignee: Sonic Colutions, Santa Clara, CA (US)

( * ) Notice: Subject to any disclaimer, the term of this patent is extended or adjusted under 35 U.S.C. 154(b) by 728 days.

(21) Appl. No.: 10/990,689

(22) Filed: Nov. 16, 2004

(51) Int. Cl.
*G06F 12/00* (2006.01)
*G11B 3/64* (2006.01)
*G11B 5/86* (2006.01)

(52) U.S. Cl. .................. 711/112; 369/84; 369/47.12
(58) Field of Classification Search .......... None
See application file for complete search history.

(56) References Cited

U.S. PATENT DOCUMENTS 6,574,642 B1 * 6/2003 James ................ 707/205
6,693,869 B1 * 2/2004 Ballantyne ............ 369/84
2004/0243749 A1 * 12/2004 Learmonth ............ 710/73
2006/0013100 A1 * 1/2006 Ho ...................... 369/84
2007/0033162 A1 * 2/2007 La ....................... 707/2

* cited by examiner

*Primary Examiner*—Denise Tran
(74) *Attorney, Agent, or Firm*—Martine Penilla & Gencarella, LLP (57) ABSTRACT

Methods and systems are provided for the automatic selection of a source drive and a destination drive when an operation to record content is performed. The method includes an evaluation of all removable media devices detected in the computing system, and the classification of the detected devices. All removable media detected in the computing system is also evaluated, and evaluation of a last used source drive and a last used destination drive is performed. When recording content to removable media, an algorithm is triggered to evaluate detected devices, evaluate detected media, and intelligently select an appropriate source drive and destination drive for the recording operation. The intelligent selection is performed automatically.

20 Claims, 6 Drawing Sheets

AUTOMATIC DRIVE SELECTION IN OPTICAL MEDIA RECORDING

BACKGROUND OF THE INVENTION

1. Field of the Invention

The present invention relates generally to recording management of removable media in computer systems, and more particularly to the recording of or writing to removable optical media.

2. Description of the Related Art

The writing or recording of data, hereinafter referred to as "recording" to optical media, has evolved into a commonplace operation for computer users in both personal and business applications. A typical consumer computer owner and operator counts recordable and re-writable CD, DVD, or other optical media, as well as the devices and applications for the recording process, among standard equipment for the home or office computer system. A plurality of programs, applications, and functions for recording to optical media, both stand-alone products and features integrated into operating systems, are available for use, and have contributed to the ease and routine of the operation of recording to optical media.

As is known, the process for recording data to optical media generally includes the selection of data files to be recorded, also known as "burned," to optical media, the processing of the files for recording, and the actual recording of the files to the target optical medium. An even simpler task is that of copying one optical medium to another. In typical applications, such as an exemplary disc copy operation, the process of recording, for the user, is a five-step process:

1. Insert a source disc
2. Insert a destination disc
3. Select the source drive
4. Select the destination drive
5. Initiate recording operation While the above process is presented as a simple operation, the recording of data can be even more automated, simple, and therefore faster and more efficient than available in current processes. For new computer users, or users new to recording data to optical media, or even those users desiring a faster, more efficient, and simpler process to record data to optical media, a more automated approach to recording data to optical media is desirable.

In view of the foregoing, there is a need for systems and methods to enable the automated selection of source and destination drives based on drive capabilities and media type when recording to optical media. The systems and methods should allow users to record to removable optical media, such as CDs and DVDs, with a minimum of configuration and settings initialization beyond the selection of data to be recorded and the execution of the record function.

SUMMARY OF THE INVENTION

Broadly speaking, the present invention fills these needs by providing for the intelligent and automatic selection of source and destination drives when recording content to optical and other removable media. The present invention can be implemented in numerous ways, including as a process, an apparatus, a system, a device, a method, or computer readable media. Several embodiments of the present invention are described below.

In one embodiment, a method for automatically selecting a source drive and a destination drive when recording content to an optical medium is provided. The method includes determining a type of optical media device present in a computing system for each optical media device in the computing system, and determining a state of each optical medium present in the computing system for each optical medium detected in the computing system. Further, the method includes determining a last used source drive and a last used destination drive, and determining whether optical media is present in each of the last used source drive and the last used destination drive. The method provides for evaluating each of the last used source drive and last used destination drive, and each optical media detected, to determine whether a last used optical media device for each of the last used source drive and the last used destination drive are selected for the source drive and the destination drive in a recording operation. If the last used optical media device for each of the last used source drive and the last used destination drive are not selected for the source drive and the destination drive in the recording operation, the method further includes evaluating additional detected optical media devices and additional optical media to determine the source drive and the destination drive when recording content to an optical medium.

In another embodiment, in an operation to record content, a method for intelligently selecting a source drive and a destination drive in a system capable of reading content from and recording content to removable media is provided. The method includes evaluating each removable media device in the system, and determining whether any removable media is present in the system. The method further includes classifying any removable media present in the system, and evaluating a last used source drive and a last used destination drive. Finally, the method includes selecting the source drive and the destination drive for the operation to record content to removable media. The method is performed automatically for the operation to record content.

In a further embodiment, computer readable media having program instructions for recording content to optical media is provided. The computer readable media includes program instructions for evaluating each optical media device detected in a computing system, and for determining whether any optical media are present in the computing system. Further, program instructions are provided for classifying any optical media present in the computing system, and for evaluating a last used source drive and a last used destination drive in the computing system. Program instructions are also included for selecting a source drive and a destination drive for recording content to optical media. The program instructions for selecting the source drive and the destination drive for recording content to optical media includes an automatic selection of the source drive and the destination drive for the recording of content.

The advantages of the present invention over the prior art are numerous. One notable benefit and advantage of the invention is making the recording process more simple and more efficient by enabling the pre-selection of proper source and destination drives for a user, automatically. Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for recording data to removable optical media is described. In preferred embodiments, methods and systems for recording data to removable optical media include algorithms to automatically select the proper source and destination optical media drives for the user. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The majority of users of removable media generally follow the above described 5-step process for recording data to optical media. The process, illustrated using an exemplary disc copy operation, can be implemented through a data recording application, as well as initiated by data recording operations implemented through the computer operating system. Optical media can include CD-ROM, CD-R, CD-RW, DVD-ROM, DVD-R/RW, DVD-RAM, DVD+R/RW, and any other type of optical media incorporated into or used with a particular computer system. Embodiments of the present invention provide for the automatic selection of the appropriate source and destination optical media drives based on such factors as drive capabilities and type of media present. In particular, embodiments of the present invention intelligently and automatically select an appropriate source and destination drive with a minimum of user interaction when performing a data recording operation.

Figure 1:
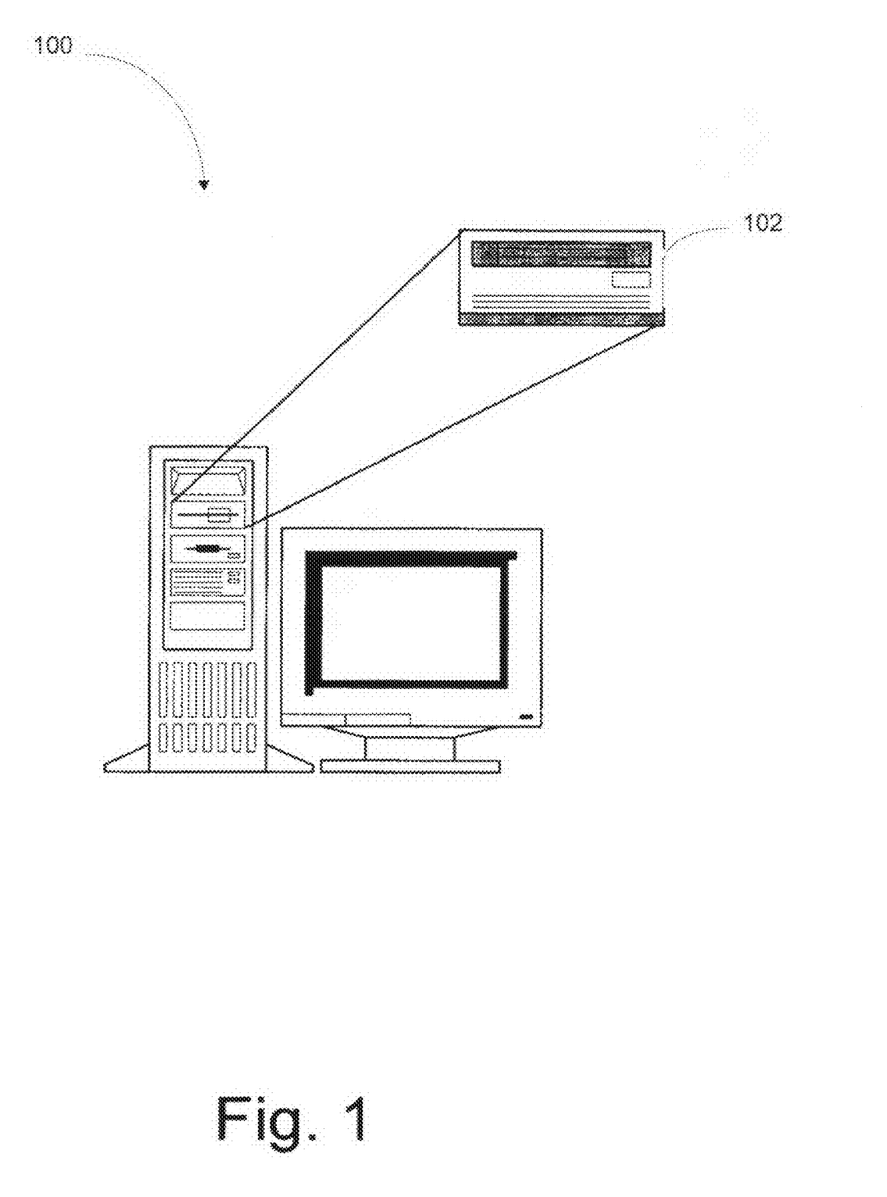
FIG. 1 illustrates a typical computer system having one or more optical media drives.

FIG. 1 illustrates a typical computer system 100 having one or more optical media drives 102. Each of the one or more optical media drives 102 is capable of receiving and accessing at least one of any type of optical media. In the illustrated computer system 100, at least one of the one or more optical media drives 102 is capable of recording to the at least one of any type of optical media. In one embodiment of the present invention, one or more optical media drives 102 are not required to be capable of recording to the at least one of any type of optical media. The one or more optical media drives 102 having recording capabilities are therefore optional, in one embodiment, but are represented in FIG. 1 to facilitate a complete and thorough illustration of various embodiments of the present invention.

In one embodiment, computer system 100 has only one optical media drive 102. The one optical media drive 102 is capable of reading removable optical media received in the optical media drive 102, but the one optical media drive 102 is not capable of writing to the removable optical media received in the optical media drive 102. In one embodiment, computer system 100 has only one optical media drive 102. The one optical media drive 102 is capable of reading removable optical media received in the optical media drive 102, and the one optical media drive 102 is also capable of writing to removable optical media received in the optical media drive 102. In one embodiment, computer system 100 has more than one optical media drive 102, and each of the more than one optical media drives 102 is capable of reading an optical media and may be capable of writing to optical media.

In one embodiment of the present invention, the at least one optical media drive 102 is classified according to the capability of the optical media drive 102. An optical media drive is classified as either "source only" (SO), having no write capabilities, or "source or destination" (SoD), having both read and write capabilities. Further, embodiments of the invention identify a "last used SO source" as that optical media drive 102 having only read capabilities that was last used as a source optical media drive 102 in a recording operation, and a "last used SoD source" as that optical media drive 102 having read and write capabilities that was last used as a source optical media drive 102 in a recording operation. Since an optical media drive 102 used as a destination optical media drive 102 in a recording would necessarily have to have write capabilities, a last used destination drive is identified as a "last used SoD destination."

In implementing embodiments of the present invention, a first use would apparently lack a "last used" SO or SoD drive. In one embodiment, values for last used drives are not assigned since no previous use is detected. In one embodiment, a default value is assigned upon installation, or upon initial launch of an application implementing embodiments of the present invention. The default value, in one embodiment, is the drive that matches the type (SO or SoD) having the lowest drive letter or device number according to the operating system in which the present invention is implemented.

Figure 2:
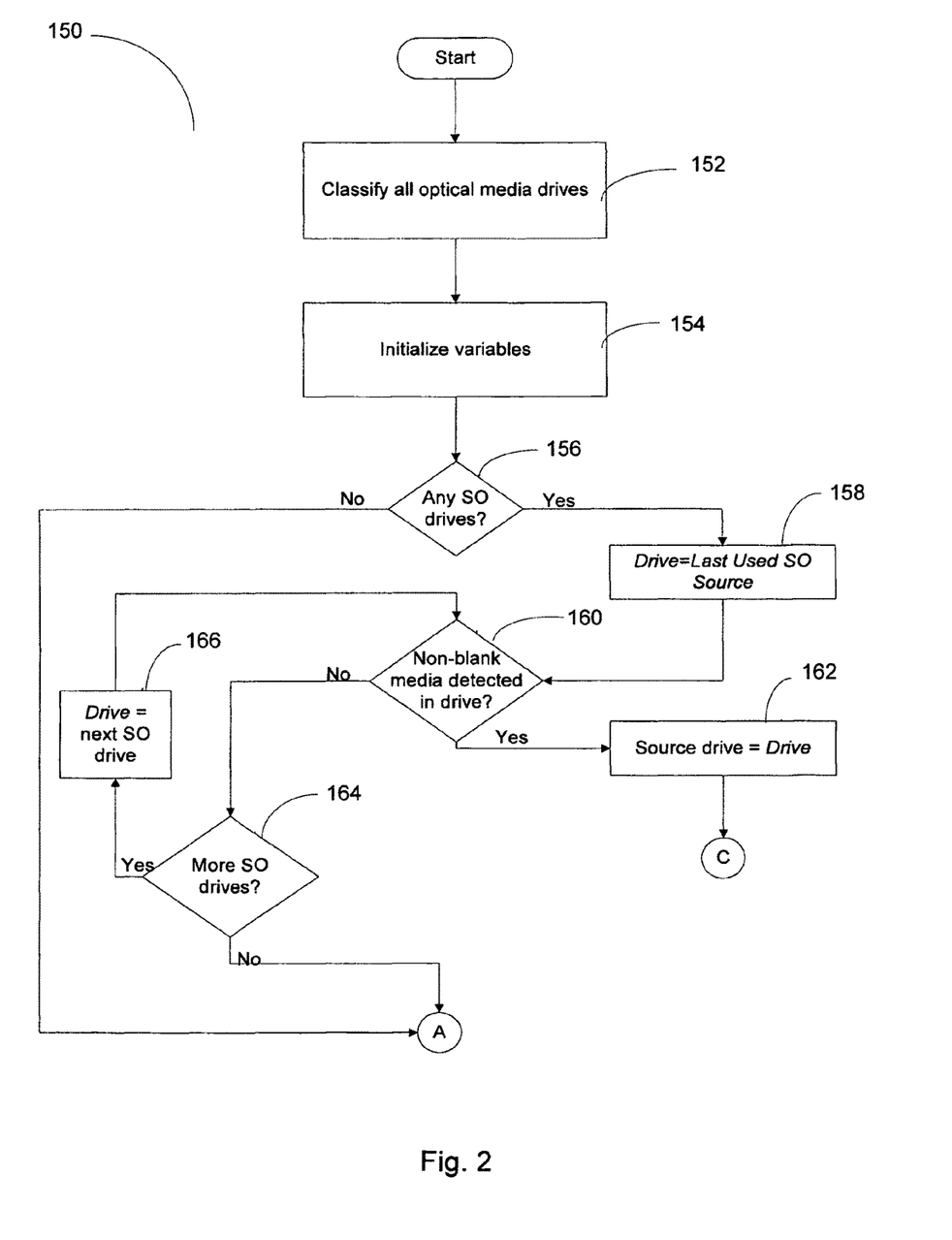
FIG. 2 is a first flowchart diagram illustrating methods of operation performed in the automatic selection of source and destination media drives for a removable optical media recording operation in accordance with an embodiment of the present invention.

FIG. 2 is a first flowchart diagram 150 illustrating methods of operation performed in the automatic selection of source and destination media drives for a removable optical media recording operation in accordance with an embodiment of the present invention. The method begins with operation 152 in which all optical media drives present and detected are classified. The term "present and detected" should be interpreted to mean that a drive is properly connected and configured to a system, and that the operating system and the application used to perform the write/copy operation recognize and can interact with the drive. As described above, the classifying of operation 152 includes identifying the optical media drives present and detected as SO drives or SoD drives. An SO drive is capable of reading optical media, and an SoD drive is capable of both reading optical media as well as recording to optical media.

The method continues with operation 154 in which the variables used in embodiments of the present invention are initialized. In one embodiment, initialization of variables includes the setting or identifying of the last used SO source (identified as Last Used SO Source), the last used SoD source (identified as Last Used SoD Source), and the last used SoD destination (identified as Last Used SoD Destination). Throughout the present application, a number of variables are used, both in the text of the specification and in the Figures. Identified variables are represented in italics for clarity. As described above, the initialization of variables in operation 154 includes the initialization of the identified variables according to the last use of an implementation of the present invention, and further includes, in an instance when the initialization is a first-time use, the setting of a default value such as a lowest drive letter or device number of the drive that matches the type (SO or SoD), or setting no value and determining a drive according to the method operations described.

Next, in decision block 156, it is determined whether any SO drives, i.e., read-only drives, are present in the system. If there are no SO drives detected, a "No" to decision block 156, the method proceeds to detect and evaluate SoD drives through connector "A" to flow chart 180 described below in reference to FIG. 3. If an SO drive is detected, a "Yes" to decision block 156, the method continues with operation 158 in which the drive selection, a variable (called Drive in this example) used to track the optical media drives evaluated and that will eventually be set to the selected source drive, is initially set to the variable Last Used SO Source initialized above in operation 154.

In decision block 160, it is determined whether a non-blank media is detected in the initial drive selection. In one embodiment, the initial drive selection, having been set to the Last Used SO Source, is evaluated to determine whether non-blank media, i.e., media containing data and therefore likely to be a source for recording, is detected in the drive. If non-blank media is detected in the drive, a "Yes" to decision block 160, the method continues with operation 162 in which the source drive is selected as the initial drive selection. That is, the Last Used SO Source was found to have non-blank media inserted, and therefore is likely to be the source in a recording operation. In operation 162, the source drive is set to that Last Used SO Source, and the method proceeds through connector "C" to flowchart diagram 220 described below in reference to FIG. 5.

If a non-blank media is not detected in the initial drive selection, a "No" to decision block 160, the method proceeds to decision block 164 in which it is determined whether any additional SO drives are present and detected in the system. If there are no more SO drives, a "No" to decision block 164, the method proceeds through connector "A" to flow chart 180 described below in reference to FIG. 3. If there are additional SO drives, the method continues with operation 166 in which the drive selection is set to the next SO drive. The method then proceeds back to decision block 160 to determine whether non-blank media is detected in the next SO drive. In one embodiment, the method continues as described until a source drive is selected from available SO drives, i.e., non-blank media is found in an SO drive in operation 160, or no SO drives are selected as a source drive in decision block 164. If no SO drives are selected to be a source drive, or if no non-blank media was detected in a SO source, the method proceeds through connector "A" to flow chart 180 described below in reference to FIG. 3.

Figure 3:
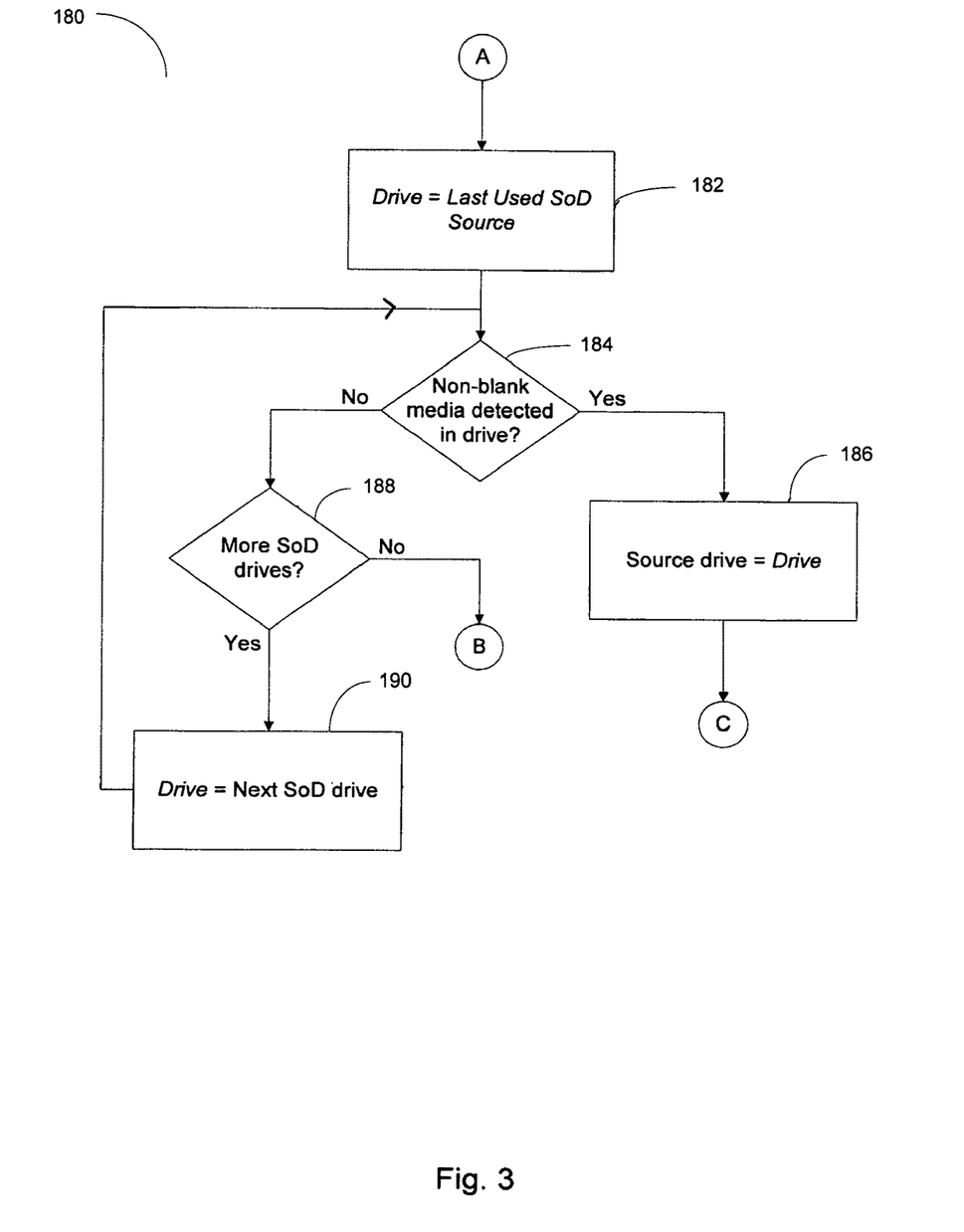
FIG. 3 is a second flowchart diagram illustrating methods of operation performed in the automatic selection of source and destination drives for removable optical media recording operations in accordance with embodiments of the present invention.

FIG. 3 is a second flowchart diagram 180 illustrating methods of operation performed in the automatic selection of source and destination drives for removable optical media recording operations in accordance with embodiments of the present invention. In one embodiment, the method provides for determining if an SoD drive will act as the source drive. Entering through connector "A," the method continues with operation 182 in which the variable Drive is set to the Last Used SoD Source. The method then continues with decision block 184 in which it is determined whether non-blank media is detected in the drive. If non-blank media is detected, a "Yes" to decision block 184, the method proceeds to operation 186 in which the currently selected drive is set as the source drive (here the Last Used SoD Source), and then the method proceeds through connector "C" to flowchart 220 described below in reference to FIG. 5. If non-blank media is not detected in the drive, a "No" to decision block 184, the method proceeds to decision block 188.

In decision block 188, it is determined whether additional SoD drives are present. If there are no more SoD drives, a "No" to decision block 188, the method proceeds through connector "B" to flow chart 200, described below in reference to FIG. 4. If there are additional SoD drives, a "Yes" to decision block 188, the method proceeds to operation 190 in which the variable Drive is incremented to the next SoD drive. The method then loops back to decision block 184 to determine whether non-blank media is present in the drive, and then through the method as already described. In this manner, each SoD drive present is evaluated until the first SoD drive is detected which contains non-blank media. In one embodiment, if a source drive is selected (operation 186), the method proceeds with selection of a destination drive as described below in reference to FIG. 5. If a source drive is not selected, two possible scenarios explain why no selection has been made. In one instance, a user has not yet inserted non-blank media as a source. In the other instance, a user in a disc copy operation may intend to make a disc from an image previously saved to the hard drive. In either event, non-blank media has not been detected and the method proceeds to flowchart 200 described below in reference to FIG. 4.

Figure 4:
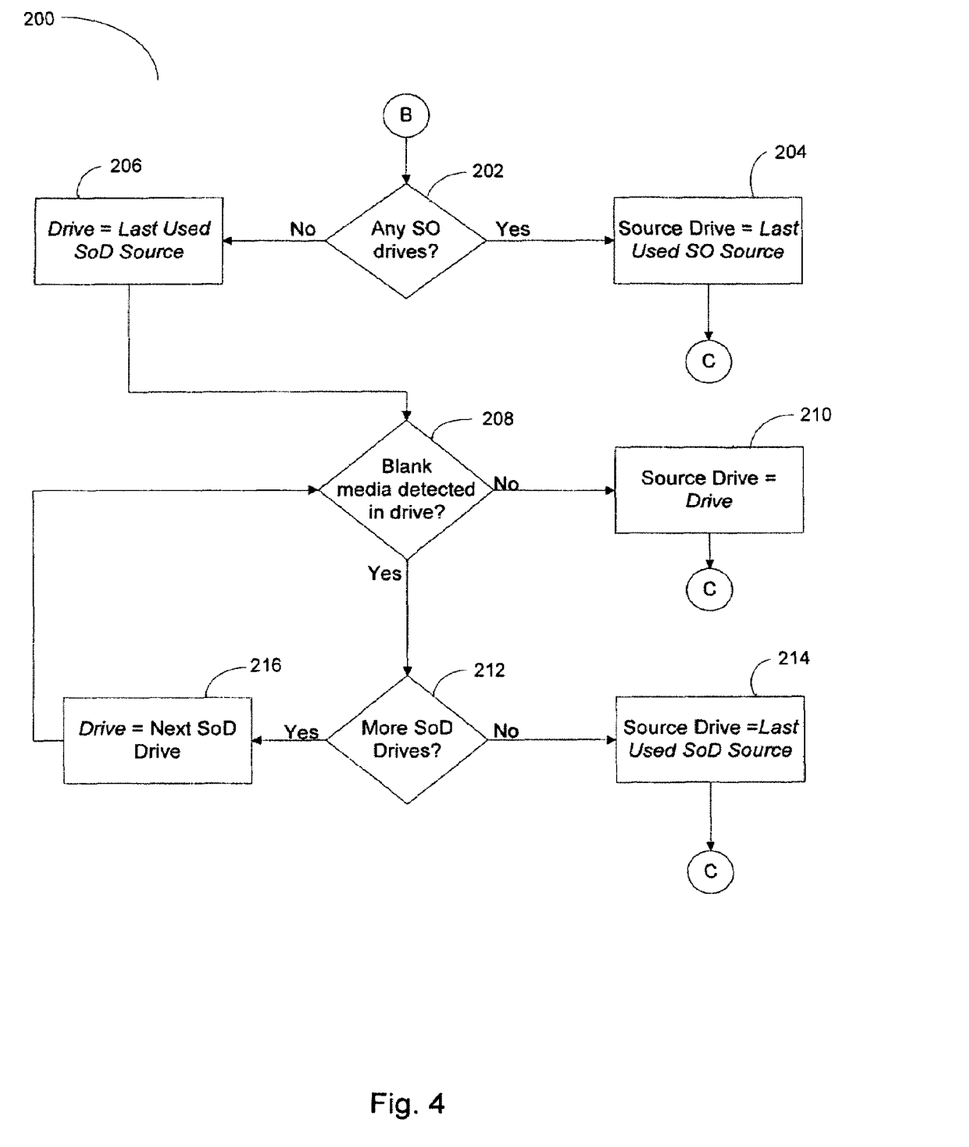
FIG. 4 is another flowchart diagram illustrating methods of operation performed in the automatic selection of source and destination drives for removable optical media recording operations in accordance with embodiments of the present invention.

FIG. 4 is another flowchart diagram 200 illustrating methods of operation performed in the automatic selection of source and destination drives for removable optical media recording operations in accordance with embodiments of the present invention. In flowchart diagram 200, no non-blank media have been detected and further source evaluations are performed. Entering through connector "B," the method proceeds with decision block 202 in which it is determined whether the system has any SO drives. As described above, no non-blank media have been detected, and in decision block 202, it is first determined whether the system has any SO drives. If an SO drive is detected, a "Yes" to decision block 202, the method continues with operation 204 in which the source drive is selected as the Last Used SO Source, and then proceeds through connector "C" to flowchart 220 described below in reference to FIG. 5. If no SO drives are detected, a "No" to decision block 202, the method proceeds to operation 206 in which the variable Drive is set to the Last Used SoD Source.

Next, in decision block 208, it is determined whether blank media is present in the drive. Blank media would likely indicate a destination drive, in one embodiment, and therefore if blank media is not detected, a "No" to decision block 208, the method proceeds to operation 210 in which the current drive (Drive) is selected as the source drive, and then the method proceeds through connector "C" to flowchart 220 described below in reference to FIG. 5. If blank media is detected, a "Yes" to decision block 208, it is more likely that the drive is a destination drive and not a source drive. The method continues to decision block 212 to determine whether additional SoD drives have been detected. If there are no more SoD drives, a "No" to decision block 212, the method continues with operation 214 in which the Last Used SoD Source is selected as the source drive, and then proceeds through connector "C" to flowchart 220. If there are additional SoD drives, a "Yes" to decision block 212, the method increments to the next SoD drive in operation 216, and then loops back to decision block 208 to determine whether blank media exists in the drive. In one embodiment, the method then continues as described until a first SoD drive that does not contain blank media is detected, or all SoD drives are evaluated and the Last Used SoD Source is selected as the source drive. A source drive is thereby selected, and embodiments of the present invention then proceed with selection of a destination drive.

Figure 5:
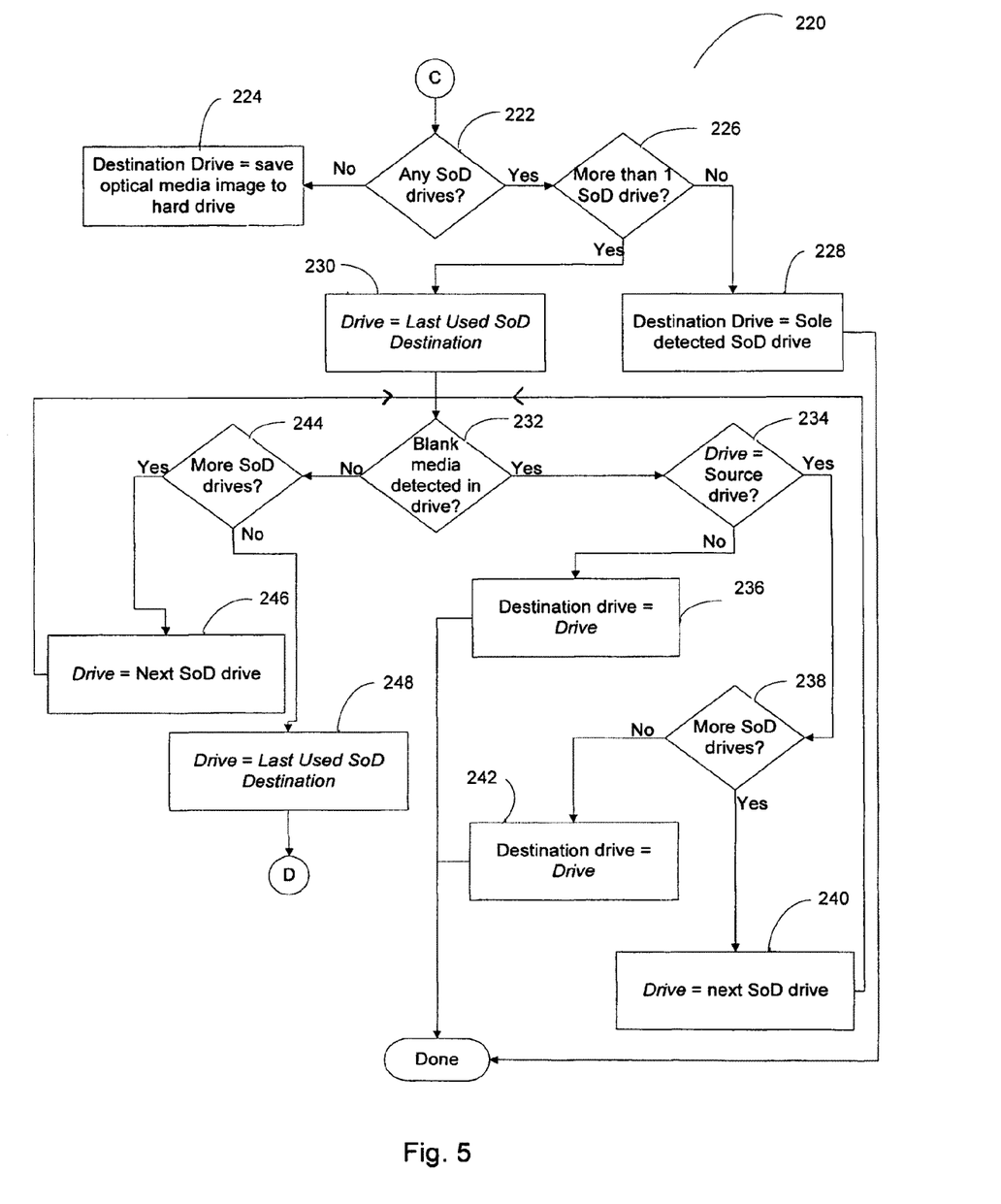
FIG. 5 is another flowchart diagram illustrating methods of operation performed in the automatic selection of source and destination drives for removable optical media recording operations in accordance with embodiments of the present invention.

FIG. 5 is another flowchart diagram 220 illustrating methods of operation performed in the automatic selection of source and destination drives for removable optical media recording operations in accordance with embodiments of the present invention. In one embodiment of the invention, once the source drive has been automatically selected as described above, the method continues with the intelligent and automatic selection of the destination drive. Entering through connector "C," the method proceeds with decision block 222 in which it is determined whether any SoD drives have been detected. In one embodiment, an SoD drive will be necessary in order to record to a removable optical medium. In one embodiment, however, the method proceeds whether or not the system is capable of recording, as configured, to a removable optical medium. It is possible, for example, to record an optical media image to the hard drive for later recording to optical media as desired. Therefore, if no SoD drives are detected, a "No" to decision block 222, the method proceeds to operation 224 in which the destination drive is selected as the hard drive, and an image of the data to be recorded will be saved to the hard drive.

In one embodiment, if an SoD drive is detected, a "Yes" to decision block 222, the method continues with decision block 226 in which it is determined whether more than one SoD drive has been detected. If there is not more than one SoD drive, a "No" to decision block 226, the method proceeds with operation 228 in which the destination drive is selected as the sole detected SoD drive, and the method is done. If there is more than one SoD drive, a "Yes" to decision block 226, the method continues with operation 230 in which the variable Drive, now used in the selection of a destination drive, is set to the Last Used SoD Destination.

Next, the method continues to decision block 232 in which it is determined whether blank media is detected in the drive. In one embodiment, a blank medium is likely to be a destination medium in a recording operation. If blank media is detected, a "Yes" to decision block 232, the method proceeds to decision block 234. In decision block 234, it is determined whether the variable Drive, currently the Last Used SoD Destination, is also the source drive as selected according to the method of operations described above. If the drive is not the selected source drive, a "No" to decision block 234, the method proceeds to operation 236 in which Drive is selected as the destination drive, and the method is done. If the drive is also the source drive as selected according to the method of operations described above, a "Yes" to decision block 234, the method proceeds to decision block 238 in which it is determined whether additional SoD drives exist. If there are more SoD drives configured, a "Yes" to decision block 238, the method continues to operation 240 in which the variable Drive is incremented to the next SoD drive, and then the method loops back to decision block 232 to determine whether blank media exist in the drive, and subsequent evaluation according to the method as already described. If there are no more SoD drives, a "No" to decision block 238, the method proceeds to operation 242 in which the variable Drive is selected as the destination drive, which in this iteration is also the source drive, and the method is done.

Returning to decision block 232, if no blank media was detected, a "No" to decision block 232, the method proceeds to decision block 244 in which it is determined whether more SoD drives are present in the system. If there are more SoD drives, a "Yes" to decision block 244, the method proceeds to operation 246 in which the variable Drive is incremented to the next SoD drive. The method then loops back to decision block 232 and makes the determination whether blank media is detected in the drive, and continues processing according to the method as described. If, in decision block 244, no additional SoD drives exist, a "No" to the decision block, the method proceeds to operation 248 in which the variable Drive is set to the Last Used SoD Destination. The method then proceeds through connector "D" to flowchart 250 described below in reference to FIG. 6.

Figure 6:
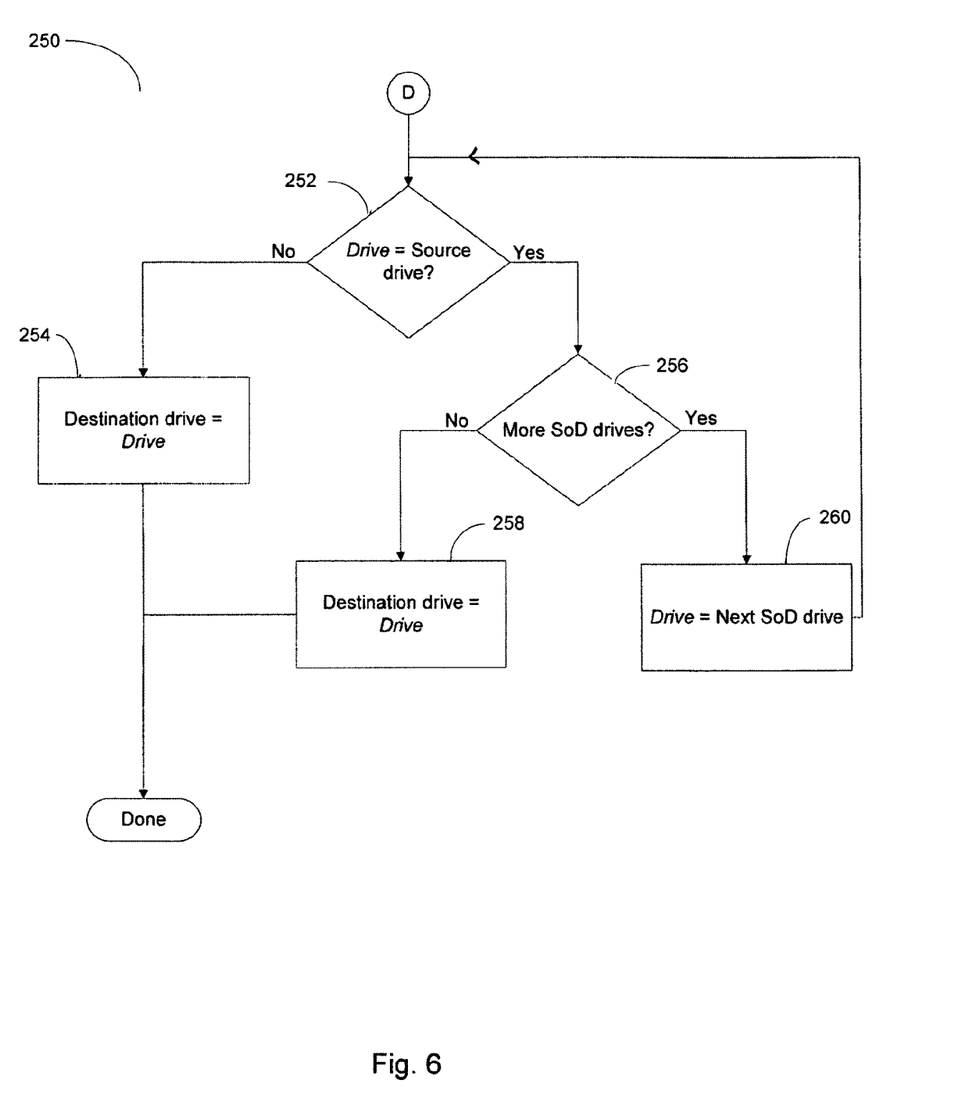
FIG. 6 is another flowchart diagram illustrating methods of operations performed in the automatic selection of source and destination drives for removable optical media recording operations in accordance with embodiments of the present invention.

FIG. 6 is another flowchart diagram 250 illustrating methods of operations performed in the automatic selection of source and destination drives for removable optical media recording operations in accordance with embodiments of the present invention. In FIG. 6, the evaluation and selection of the destination drive continues. Entering through connector "D," the method continues with decision block 252 in which it is determined whether the current variable Drive is also the source drive as selected according to the method of operations described above. If the variable Drive is not the selected source drive, a "No" to decision block 252, the method continues to operation 254 in which the destination drive is selected as the current value of the variable Drive, and the method is done. If the current variable Drive is also the already selected source drive, a "Yes" to decision block 252, the method proceeds to decision block 256.

In decision block 256, it is determined whether additional SoD drives are present in the system. If there are no more SoD drives, a "No" to decision block 256, the method proceeds to operation 258 in which the destination drive is selected as the current value of the variable Drive, and the method is done. If there are more SoD drives, a "Yes" to decision block 256, the method proceeds with operation 260 in which the variable Drive is incremented to the next SoD drive, and then loops back to decision block 252 for continued processing as described. Upon selection of a destination drive in flowchart 250, the method is done.

It should be noted that the above method is initiated in any of a plurality of methods used to record content to removable media, copying optical or other removable media, as well as recording an optical media image to a hard drive. Any number of examples can be cited that correspond with a plurality of operating systems, as well as the multiple applications executed within the plurality of operating systems. Using the common Windows™ operating system as just one example, a user can select an icon representing a file, files, directory, or entire disc or other removable media and press the right mouse button. In this case, a menu typically will appear that allows the user to select from several different operations related to the selected files or disc. One of these operations might be a "send to" operation, which allows a user to select a particular drive which the selected content is to be recorded. Other exemplary file writing techniques include using a file management utility (e.g., Windows™ Explorer™) to transfer the selected content to a desired drive by "dragging" files to the drive icon.

When using Windows™ Explorer™ (used here only as an exemplary file utility, and in the exemplary Windows™ environment), for example, the user may select a folder, files, or entire drive from a list of folders and drives displayed in a left frame of the Windows™ Explorer™ user interface. The contents of the selected folder or drive are then displayed in a right frame of the Windows™ Explorer™ user interface. The user can "drag" the icon (or icons) representing the selected content from the right frame to the desired media drive icon in the left frame to initiate a recording operation, triggering intelligent and automatic drive selection in accordance with embodiments of the present invention.

When using the method of "dragging" the file (or files) to a drive icon, the user may select content to record by using the keyboard and/or mouse cursor. Then, to save the selected content, the user drags the icon (or icons) representing the selected content to the drive icon, and then releases the mouse button. Other techniques for recording content to removable media are generally well known and are dependent on the operating system environment utilized by the computer system. As such, it should be appreciated that the embodiments of the present invention can be utilized in conjunction with generally any technique utilized to interact with removable media.

It should be appreciated that the above examples recited using the Windows™ Explorer™ program are intended to be exemplary only, and not all-inclusive or exhaustive of the many applications and operating systems in which embodiments of the present invention can be implemented.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of computer readable media include hard drives, network attached storage (NAS), read-only memory, random-access memory, CD-ROMs, CD-Rs, CD-RWs, DVD-ROM, DVD-R/RW, DVD-RAM, DVD+R/RW, magnetic tapes, floppy disks, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for automatically selecting a source drive and a destination drive when recording content to an optical medium, the method comprising:
   determining a type of optical media device present in a computing system for each optical media device in the computing system;
   determining a state of each optical medium present in the computing system for each optical medium detected in the computing system;
   determining a last used source drive and a last used destination drive;
   determining whether optical media is present in each of the last used source drive and the last used destination drive; and
   evaluating each of the last used source drive and last used destination drive, and each optical media detected to determine whether a last used optical media device for each of the last used source drive and the last used destination drive are selected for the source drive and the destination drive in a recording operation,
   wherein, if the last used optical media device for each of the last used source drive and the last used destination drive are not selected for the source drive and the destination drive in the recording operation, the method further includes evaluating additional detected optical media devices and additional optical media to determine the source drive and the destination drive when recording content to the optical medium.

2. The method of claim 1, wherein the determining the type of optical media device present in the computing system for each optical media device in the computing system includes determining whether the optical media device is capable of reading from optical media and whether the optical media device is capable of writing to optical media.

3. The method of claim 1, wherein the determining the state of each optical medium present in the computing system for each optical medium detected includes determining if the optical media is blank and determining if the optical media is non-blank.

4. The method of claim 1, wherein the computing system includes at least one optical media device.

5. The method of claim 1, wherein the optical media includes one of a CD optical media and a DVD optical media.

6. The method of claim 2, wherein when no optical media device is capable of writing to optical media, a hard drive is selected as the destination drive, the hard drive being identified to receive an image of an optical medium.

7. In a system capable of reading content from and recording content to removable media, a method for intelligently selecting a source drive and a destination drive in an operation to record content, the method comprising:
   evaluating each removable media drive detected in the system;
   determining whether any removable media is present in each of the removable media drive;
   classifying any removable media present within each of the removable media drive in the system; and
   selecting the source drive and the destination drive from one of the removable media drive detected in the system based on the evaluation of each removable media drive and classification of each removable media present in the system, the selection of the source drive determined by presence of a non-blank removable media within one of a last used removable media drive or each of additional removable media drive detected in the system, the selection of the destination drive determined by presence of a blank removable media within one of a last used removable media drive or each of additional removable media drive detected in the system, wherein the source drive and the destination drive are distinct,
   wherein the method is performed automatically for the operation to record content.

8. The method of claim 7, wherein the evaluating each removable media drive in the system includes classifying each removable media drive as one of a source-only removable media drive and a source-or-destination removable media drive.

9. The method of claim 8, wherein the source-only removable media drive is capable of reading content from removable media.

10. The method of claim 8, wherein the source-or-destination removable media device drive is capable of reading content from and writing content to removable media.

11. The method of claim 7, wherein the classifying of any removable media in the system includes identifying removable media as one of blank and non-blank.

12. The method of claim 7, wherein removable media includes CD and DVD optical media.

13. The system of claim 7, wherein the selection of the source drive including,
   identifying a last used removable media drive as the source drive;
   determining if the last used removable media drive includes the non-blank removable media;
   selecting the last used removable media drive as the source drive for recording content when the non-blank removable media is present in the last used removable media drive;
   selecting a first of the additional removable media drive detected in the system containing the non-blank removable media as the source drive when the last used removable media drive does not contain the non-blank removable media; and
   identifying the last used removable media drive as the source drive when each of the removable media drive detected in the system does not contain a non-blank removable media.

14. The system of claim 7, wherein the selection of the destination drive including,
   identifying a last used removable media drive as the destination drive;
   determining if the last used removable media drive includes the blank removable media;
   selecting the last used removable media drive as the destination drive for recording content when the blank removable media is present in the last used removable media drive;
   selecting a first of the additional removable media drive detected in the system containing the blank removable media as the destination drive when the last used removable media drive does not contain the blank removable media;
   identifying the last used removable media drive as the destination drive when each of the removable media drive detected in the system does not contain the blank removable media.

15. Computer readable media having program instructions embedded on a data storage device which when read by a computing system causes the computer system to perform a method for recording content to optical media, the computer readable media comprising:
   evaluating each optical media drive detected in the computing system;
   determining whether any optical media are present within each of optical media drive in the computing system;
   classifying any optical media present within each of the optical media drive in the computing system; and
   selecting a source drive and a destination drive from one of the optical media drive detected in the system based on the evaluation of each optical media drive and classification of each optical media detected in the computing system, the selection of the source drive determined by presence of a non-blank optical media within one of a last used optical media drive or each of additional optical media drive detected in the computing system, the selection of the destination drive determined by presence of a blank optical media within one of a last used optical media drive or each of additional optical media drive detected in the system, wherein the source drive and the destination drive are distinct,
   wherein selecting the source drive and the destination drive for recording content to optical media includes an automatic selection of the source drive and the destination drive for the recording of content.

16. The computer readable media of claim 15, wherein evaluating each optical media drive detected in the computing system include classifying each optical media drive as one of a source only optical media drive and a source or destination optical media drive.

17. The computer readable media of claim 16, wherein the source only optical media drive is capable of reading content from optical media.

18. The computer readable media of claim 16, wherein the source or destination optical media drive is capable of reading content from and writing content to optical media.

19. The computer readable media of claim 15, further comprising recording content as an optical media image to a hard drive of the computing system.

20. The computer readable media of claim 15, wherein classifying any optical media present in the computing system includes identifying optical media as one of blank and non-blank.

* * * * *

UNITED STATES PATENT AND TRADEMARK OFFICE
CERTIFICATE OF CORRECTION

PATENT NO. : 7,475,188 B1  Page 1 of 1
APPLICATION NO. : 10/990689
DATED : January 6, 2009
INVENTOR(S) : Paul Plitzuweit It is certified that error appears in the above-identified patent and that said Letters Patent is hereby corrected as shown below:

On the Title page, Item (73), please correct the assignee name from "Sonic Colutions" to "Sonic Solutions".

Signed and Sealed this

Twenty-fourth Day of March, 2009

JOHN DOLL
*Acting Director of the United States Patent and Trademark Office*